United States Patent
Northwall et al.

(10) Patent No.: US 9,917,491 B2
(45) Date of Patent: Mar. 13, 2018

(54) GROUND RING AND ENCLOSURE IN AN ELECTRIC MOTOR

(71) Applicant: Nidec Motor Corporation, St. Louis, MO (US)

(72) Inventors: Joel W. Northwall, St. Louis, MO (US); Kenneth R. Theis, Collinsville, IL (US); Timothy J. Druhe, Granite City, IL (US); David M. Lyle, Glencoe, MO (US)

(73) Assignee: Nidec Motor Corporation, St. Louis, MO (US)

( * ) Notice: Subject to any disclaimer, the term of this patent is extended or adjusted under 35 U.S.C. 154(b) by 407 days.

(21) Appl. No.: 14/200,545

(22) Filed: Mar. 7, 2014

(65) Prior Publication Data
US 2015/0256054 A1    Sep. 10, 2015

(51) Int. Cl.
*H02K 5/136*   (2006.01)
*H02K 11/00*   (2016.01)
(Continued)

(52) U.S. Cl.
CPC ......... *H02K 11/0089* (2013.01); *H02K 5/136* (2013.01); *H02K 11/40* (2016.01);
(Continued)

(58) Field of Classification Search
CPC ........ H02K 5/136; H02K 11/40; H02K 5/161; H02K 5/1672; H02K 5/1732
(Continued)

(56) References Cited

U.S. PATENT DOCUMENTS 4,114,902 A * 9/1978 Orlowski ............... F16C 33/80
                                                       277/427
4,189,702 A   2/1980 Maloy
(Continued)

FOREIGN PATENT DOCUMENTS

CN         202435202 U    9/2012
DE   10 2005 045 960 A1   4/2007
(Continued)

OTHER PUBLICATIONS

Grainger; Hazardous Locations: Classes, Divisions and Groups; QuickTips Technical Resources, Safety; Jan. 2012; 3 Pages; Quick Tips #124; W.W. Grainger, Inc., www.Grainger.com.
(Continued)

*Primary Examiner* — Quyen Leung
*Assistant Examiner* — Eric Johnson
(74) *Attorney, Agent, or Firm* — Maginot, Moore & Beck, LLP

(57) ABSTRACT

An enclosure for a ground ring includes an enclosure housing configured to accept a ground ring and hold the ground ring in a predetermined position around a shaft that is electrically connected to a drive shaft of an electric motor. The ground ring having a first opening for the drive shaft and the enclosure housing has a second opening for the drive shaft. The enclosure includes an attachment configured to hold the enclosure housing around the shaft to dissipate an electrical charge and to form a cavity that contains the ground ring and includes a predetermined gap between a perimeter of the second opening of the enclosure and a surface of the drive shaft.

12 Claims, 9 Drawing Sheets

(51) Int. Cl.
   *H02K 11/40* (2016.01)
   *H02K 5/173* (2006.01)
   *H01R 39/12* (2006.01)
   *H01R 39/64* (2006.01)

(52) U.S. Cl.
   CPC .............. *H01R 39/12* (2013.01); *H01R 39/64* (2013.01); *H02K 5/1732* (2013.01); *H02K 2213/03* (2013.01)

(58) Field of Classification Search
   USPC ......................................................... 310/88
   See application file for complete search history.

(56) References Cited

U.S. PATENT DOCUMENTS

| | | | |
|---|---|---|---|
| 4,307,432 | A | 12/1981 | Nishikawa |
| 4,515,417 | A | 5/1985 | Shiraishi |
| 4,801,270 | A | 1/1989 | Scarlata |
| 4,920,289 | A | 4/1990 | Saito |
| 5,010,441 | A | 4/1991 | Fox et al. |
| 5,085,373 | A | 2/1992 | Behr et al. |
| 5,090,710 | A | 2/1992 | Flower |
| 5,227,950 | A | 7/1993 | Twerdochlib |
| 5,251,081 | A | 10/1993 | Cossette et al. |
| 5,400,208 | A | 3/1995 | Pazda et al. |
| 5,661,353 | A | 8/1997 | Erdman et al. |
| 5,690,014 | A | 11/1997 | Larkin |
| 5,967,525 | A | 10/1999 | Fedorovich |
| 6,078,117 | A | 6/2000 | Perrin et al. |
| RE37,058 | E | 2/2001 | Elsasser et al. |
| 6,315,475 | B1 | 11/2001 | Carter et al. |
| 6,386,546 | B1 | 5/2002 | Fedorovich |
| 6,419,233 | B2 | 7/2002 | Orlowski |
| 6,608,410 | B2 | 8/2003 | Sato et al. |
| 6,670,733 | B2 | 12/2003 | Melfi |
| 6,686,673 | B1 | 2/2004 | Komura et al. |
| 6,896,735 | B2 | 5/2005 | Giuliano et al. |
| 6,909,868 | B2 | 6/2005 | Yamada et al. |
| 7,136,271 | B2 | 11/2006 | Oh et al. |
| 7,193,836 | B2 | 3/2007 | Oh et al. |
| 7,352,090 | B2 | 4/2008 | Gustafson et al. |
| 7,521,827 | B2 | 4/2009 | Orlowski et al. |
| 8,199,453 | B2 | 6/2012 | Oh et al. |
| 2001/0017496 | A1 | 8/2001 | Sato et al. |
| 2002/0121821 | A1 | 9/2002 | Ritter |
| 2002/0136161 | A1 | 9/2002 | Cleereman et al. |
| 2003/0030340 | A1 | 2/2003 | Tashiro |
| 2003/0057783 | A1 | 3/2003 | Melfi |
| 2003/0086630 | A1 | 5/2003 | Bramel et al. |
| 2004/0135016 | A1 | 7/2004 | Baumann et al. |
| 2004/0184215 | A1 | 9/2004 | Oh et al. |
| 2004/0233592 | A1* | 11/2004 | Oh ..................... G11B 19/2009 361/23 |
| 2006/0007609 | A1 | 1/2006 | Oh et al. |
| 2007/0138748 | A1 | 6/2007 | Orlowski et al. |
| 2007/0159017 | A1 | 7/2007 | Martin et al. |
| 2007/0159763 | A1 | 7/2007 | Barnard et al. |
| 2008/0258576 | A1 | 10/2008 | Oh et al. |
| 2010/0001602 | A1* | 1/2010 | Bossaller ............... H02K 11/40 310/89 |
| 2010/0127585 | A1 | 5/2010 | Fee et al. |
| 2011/0031830 | A1 | 2/2011 | Oleson et al. |
| 2011/0062818 | A1* | 3/2011 | Oh ......................... H02K 11/40 310/228 |
| 2011/0101618 | A1* | 5/2011 | Orlowski ............. F16J 15/4478 277/412 |
| 2011/0193446 | A1* | 8/2011 | Orlowski ............... H01R 39/64 310/232 |
| 2013/0099624 | A1 | 4/2013 | Vicars et al. |

FOREIGN PATENT DOCUMENTS

| | | |
|---|---|---|
| EP | 0 847 807 A2 | 6/1998 |
| EP | 1 755 207 A2 | 2/2007 |
| EP | 2 549 626 A1 | 1/2013 |
| GB | 2 337 796 A | 5/1998 |
| JP | 7284240 A | 10/1995 |
| JP | 2007-116839 A | 5/2007 |
| JP | 2013-021860 A | 1/2013 |
| WO | 2013/192169 A1 | 12/2013 |

OTHER PUBLICATIONS

Inpro/Seal; Prototype Ex Mgs; Drawing No. T9999-ZA-62330-11; 1 Page.
Inpro/Seal; Introducing the InprolSeal CDR XP, an Explosion Proof Certified Shaft Grounding Solution; 2010-2014; 3 Pages; Waukesha Bearings Corporation; www.inpro-seal.com.
International Search Report and Written Opinion of the International Searching Authority corresponding to PCT Application No. PCT/US2015/017430; Korean Intellectual Property Office, Daejeon Metropolitan City, Korea; dated May 21, 2015; (13 pages).
Eropean Search Report corresponding to European Application No. 15757841.0; dated Oct. 9, 2017; 15 Pages.

* cited by examiner

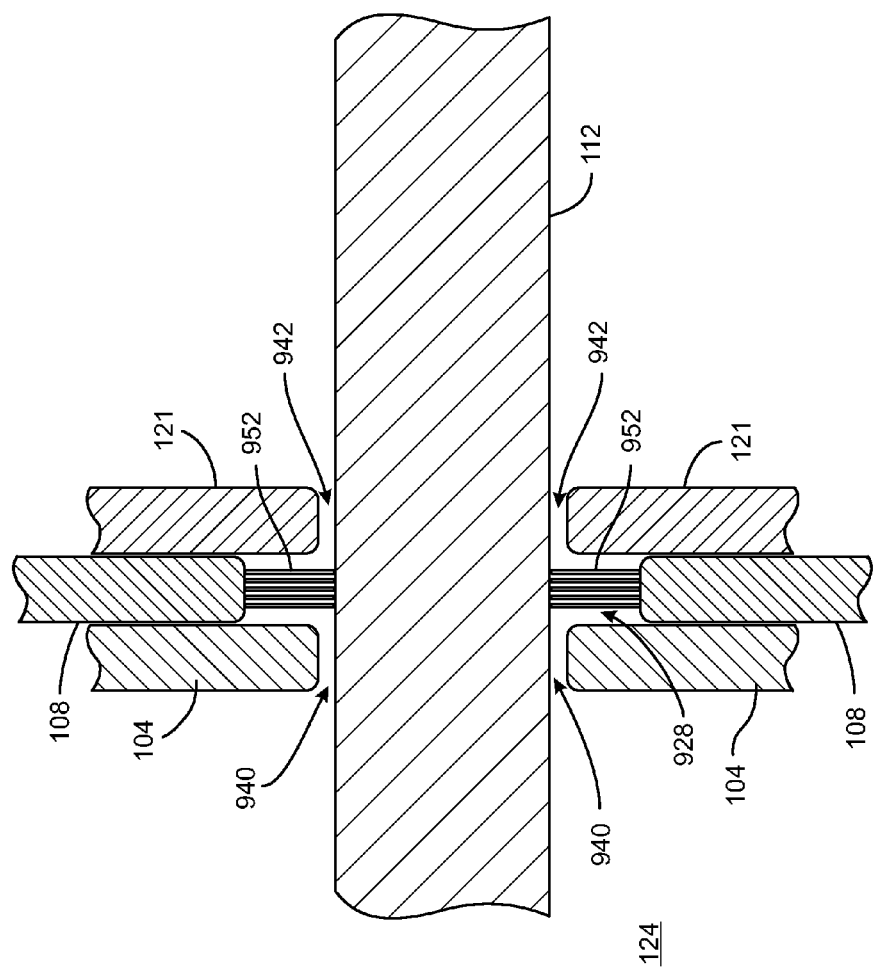

GROUND RING AND ENCLOSURE IN AN ELECTRIC MOTOR

TECHNICAL FIELD

This disclosure relates generally to electrical motors, and more particularly, to ground rings and enclosures for ground rings used in electrical motors.

BACKGROUND

Some electric motors operate with a variable frequency drive (VFD) system that adjusts the rotational speed of the motor by varying a frequency of an alternating current (AC) electrical power signal that drives the motor. During operation of the motor, the AC power signal can induce an electrical charge on the surface of the motor drive shaft. The electrical charge can build to a level sufficient to enable an arc from the shaft to another component in or around the motor. The drive shaft bearing is one component in an electric motor that can experience arcing from the drive shaft because the bearing is close to the drive shaft and often provides a path of least resistance for the electric charge. The arcing from the drive shaft damages components in the bearing and may require premature replacement of the bearing.

In order to reduce or eliminate arcing through the motor bearing, some motors use ground rings. A ground ring is an electrical conductor that is formed around the drive shaft and connected to an electrical ground to provide a path of least resistance for electric charges that accumulate on the surface of the drive shaft. Some ground rings use electrically conductive wire brushes that are arranged around the drive shaft at a predetermined distance from the drive shaft surface to bleed electrical charge through the ground ring instead of through the bearing or other components in the motor.

While ground rings are useful in preventing damage to drive bearings, the charge on the drive shaft may reach a level that enables arcing of the electric charge from the drive shaft. The possibility of arcing to the ground ring makes electrical motors having ground rings unsuitable for use in some environments where the atmosphere around the motor includes potentially flammable gases or other materials that could ignite in response to arcing. For example, regulatory requirements in many countries prevent the use of electric motors in environments potentially hazardous environments where accidents or other abnormal operating conditions may expose the motor to flammable gases or other flammable materials. The regulatory standards preclude the use of existing ground rings with electric motors. In light of these deficiencies, improvements to electric motors that enable the use of electric motors in a wider range of operating environments would be beneficial.

SUMMARY

An enclosure for a ground ring for use with an electric motor has been developed. The enclosure includes a housing configured to receive a ground ring and hold the ground ring in a predetermined position around a shaft that is a drive shaft of an electric motor or another shaft that is electrically connected to the drive shaft. The ground ring has a first opening configured to enable the shaft to pass therethrough and the enclosure housing having a second opening configured to enable the shaft to pass therethrough. The enclosure further includes an attachment configured to hold the enclosure housing against a mounting member to form a cavity that contains the ground ring with a tight fit between the enclosure housing and the mounting member and a predetermined gap between a perimeter of the second opening of the enclosure housing and a surface of the shaft.

A ground ring assembly configured to be mounted on a shaft that is a drive shaft of an electric motor or another shaft that is electrically connected to the drive shaft. The ground ring assembly includes an enclosure housing configured to receive a ground ring and hold the ground ring in a predetermined position around a shaft, the ground ring having a first opening configured to enable the shaft to pass therethrough, a second opening formed in the enclosure housing, the second opening being configured to enable the shaft to pass therethrough and bearing having a third opening configured to enable the shaft to pass therethrough. The enclosure housing is attached to the bearing to form a cavity that contains the ground ring forms a tight fit between the enclosure housing and the bearing with a predetermined gap between a perimeter of the second opening of the enclosure housing and a surface of the shaft.

BRIEF DESCRIPTION OF THE DRAWINGS

FIG. 9 is a detailed view of the enclosure of FIG. 1 and FIG. 2.

DETAILED DESCRIPTION

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

Figure 1:
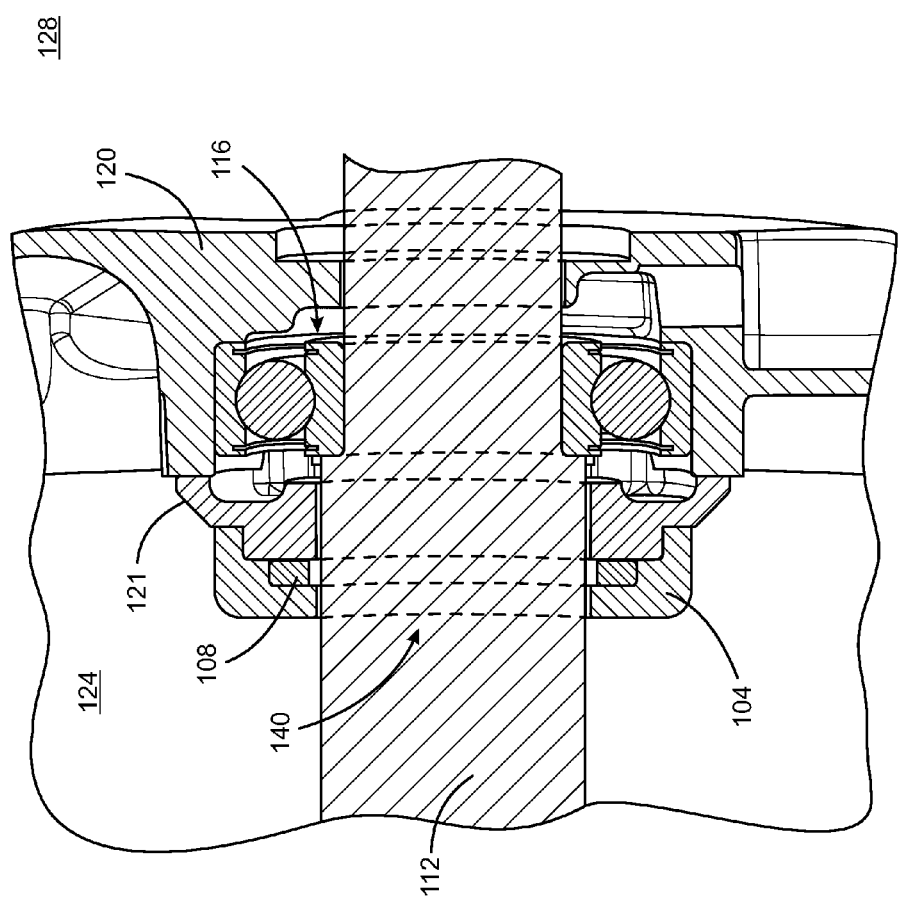
FIG. 1 is a cross-sectional view of an enclosure for a ground ring and a ground ring that is mounted on an interior of an electric motor housing.
Figure 2:
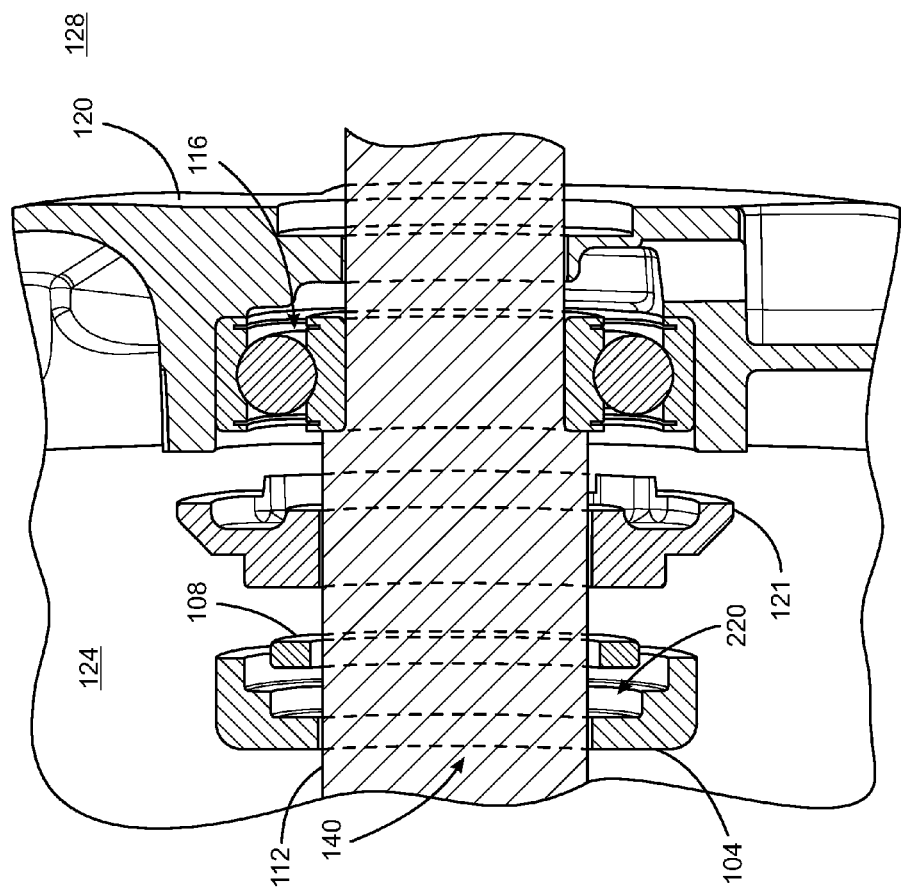
FIG. 2 is a partially exploded view of the enclosure, ground ring, and electric motor of FIG. 1.

FIG. 1 and FIG. 2 depict an enclosure housing (also referred to as "enclosure") 104 for a ground ring 108 that surrounds an electric motor drive shaft 112 and is attached to a bearing holder 121 on an interior side of an electric motor housing 120. The bearing holder 121 and drive shaft 112 engages a bearing 116 and emerges from the electric motor housing 120 to drive a mechanical load (not shown). The bearing 116 is a rolling element bearing such as a ball bearing, cylindrical roller, or any other suitable bearing. The enclosure 104, ground ring 108, and bearing holder 121 are positioned on the interior side 124 of the motor housing 120. The drive shaft 112 extends through openings in each of the enclosure 104, ground ring 108, and bearing holder 121 from the interior side 124, and through the bearing 116 to an exterior side 128 to drive a load. For illustrative purposes, the view of the electric motor in FIG. 1 and FIG. 2 omits other components of the motor, such as the rotor, stator, and windings. While the illustrative embodiments described below depict the ground ring and ground ring enclosure engaging a drive shaft of an electric motor, the ground ring and ground ring enclosure embodiments described herein can also engage other rotating shafts that form an electrical connection to the drive shaft to enable the ground ring and ground ring enclosure to drain static charge and to prevent an escape of flame from a cavity surrounding the ground ring.

The enclosure 104 includes one or more attachment members that enable the enclosure 104 to be attached to the bearing holder 121 to form a tight fit between the enclosure 104 and the bearing holder 121. As used herein, the term "tight fit" refers to any fitting between two components that form a cavity to prevent escape of a flame from the cavity in the event of an ignition of gas or other flammable substance within the cavity. Instead, the flame is directed to a predetermined flame path that dissipates thermal energy from the flame to contain the flame within the cavity. A substantially airtight seal between the enclosure housing 104 and the bearing holder 121 or another mounting member is one example of a tight fit, although the tight fit does not necessarily require an airtight seal to be effective.

The bearing holder 121 is a mounting member that is attached to an interior of the motor housing 120 proximate to the bearing 116 to hold the enclosure housing 104 and ground ring 108 in a predetermined position around the drive shaft 112 without interfering with the operation of the bearing 116. A mounting member is any structure that holds the enclosure 104 and the ground ring 108 in a predetermined location relative to the drive shaft 112. The mounting member forms a portion of the enclosure in some embodiments. The attachment members are, for example, bolt holes that mate with corresponding bolt holes in the motor housing 120, a threaded adapter on the enclosure 104 that mates with a corresponding threaded adapter formed in the interior of the motor housing 120, flange, bracket mounting formed in the motor housing 120, or any other suitable attachment member. The attachment member is embodied as a removable attachment that enables the enclosure 104, ground ring 108, and the bearing holder 121 to be removed from the drive shaft 112 and motor housing 120 during maintenance operations, although other attachment methods, such as welding, can be used in alternative embodiments.

As depicted in FIG. 2, the enclosure 104 includes an interior shape that accepts the ground ring 108 through, for example, an interference fit or other attachment to secure the ground ring to the enclosure 104. In FIG. 2 the enclosure 104 includes a bracket 220 that accepts the ground ring 108 and holds the ground ring 108 in a predetermined position relative to the surface of the drive shaft 112. The ground ring 108 is shown as being removable from the enclosure 104 to enable the ground ring 108 to be removed and replaced during maintenance of the motor. The enclosure 104 is formed from an electrically conductive material and the ground ring 108 fits the enclosure 104 to both secure the ground ring 108 in place and electrically connect the ground ring 108 to the enclosure 104. The conductive interface of enclosure 104 to bearing holder 121 to bracket 120 provides a path for an electrical charge from drive shaft 112 to pass through the ground ring 108 through these components to an electrical ground. Alternate methods form a ground path using a wire or other electrical conductor (not shown) that is attached to the enclosure 104 and provides a path for an electric charge from the drive shaft 112 to pass through the ground ring 108 and enclosure 104 to an electrical ground.

As described above, the enclosure 104 forms a tight fit with the bearing holder 121, and the bearing holder 121 forms a tight perimeter fit with the enclosure 104. The enclosure 104 and the bearing holder 121 form a cavity that includes the ground ring 108 and a portion of the drive shaft 112. The ground ring 108 is positioned around the drive shaft 112 to enable the drive shaft 112 to pass through an opening in the ground ring. The ground ring 108 includes electrically conductive brushes or other members positioned around the drive shaft 112. The outer ground ring 108 does not contact the drive shaft 112 directly, but the ground ring 108 includes brushes formed from electrically conductive elements that contact surface of the shaft 112 to provide an electrical path for electrical charges that accumulate on the drive shaft 112 to flow to an electrical ground The brushes in the ground ring 108 do not impede the rotation of the drive shaft 112 during operation of the electric motor.

The enclosure 104 includes another opening 140 that enables the drive shaft 112 to pass through the enclosure 104. The opening in the enclosure 104 is formed with a diameter that is larger than the diameter of the drive shaft 112 by a predetermined amount to provide a predetermined gap between the drive shaft 112 and the enclosure 104. In one embodiment, the predetermined gap is 0.009 inches (approximately 0.23 millimeters) between the perimeter of the enclosure opening 140 and the surface of the drive shaft 112. In other embodiments, the gap is formed in a range of approximately 0.001 inches to 0.020 inches. As described below, the gap between the drive shaft 112 and the enclosure housing 104 forms a flame path that dissipates thermal energy from a flame in the event of ignition of a gas or flammable substance due to sparks between the drive shaft 112 and the ground ring 108. The diameter of the opening for the ground ring 108 is larger than the diameter of the opening 140 through the enclosure 104.

The predetermined gap between the enclosure 104 and the drive shaft 112, along with the gap between the bearing holder 121 and the drive shaft 112, enables the drive shaft 112 to rotate without touching the enclosure 104. In one embodiment, the gap between the opening of the bearing holder 121 and the drive shaft 112 is substantially the same size as the gap between the perimeter of the opening in the enclosure 104 and the drive shaft 112. In another embodiment, the opening in the bearing holder 121 is larger to produce a large gap because the bearing 116 also fits around the drive shaft 112 to prevent the escape of a flame from the cavity formed by the enclosure 104 and the bearing holder 121. The gap between the enclosure 104 and the drive shaft 112 is not airtight and enables exchange of air and other gasses in the motor housing with the cavity formed by the enclosure 104 and the bearing holder 121. While not completely airtight, the predetermined gap is also sufficiently narrow to reduce or eliminate the likelihood that ignition of gas or other materials within the cavity formed between the enclosure 104 and the bearing holder 121 could spread to the interior side 124 of the motor housing or to the atmosphere around the exterior 128 of the motor.

During operation, the shaft 112 rotates as the electric motor drives a load. An electrical power source provides the electrical power to operate the motor, and the shaft 112 typically accelerates and decelerates from idle and between different operating speeds during operation. The surface of the shaft 112 receives an electric charge that accumulates as the shaft 112 accelerates and decelerates to different velocities and in some instances the shaft 112 also receives an electrical charge due to an alternating current (AC) signal from the power source. In the configuration of FIG. 1 and FIG. 2, the ground ring 108 provides the path of least resistance between the surface of the shaft 112 and electrical ground. Thus, excess charge that accumulates on the shaft 112 travels through the ground ring 108 instead of building to a level of charge sufficient to arc through the bearing 116, which potentially damages the bearing 116.

As is known in the art, the transfer of electrical charge from the shaft 112 to the ground ring 108 may produce sparks that have sufficient energy to ignite some flammable gasses. As described above, the motor typically operates in a normal atmosphere that does not contain flammable gasses, but under unusual circumstances the motor may be exposed to flammable gasses. The enclosure 104 and the bearing holder 121 form a cavity that has a comparatively small volume for flammable gasses to penetrate through the gap that is formed between the enclosure opening 140 and the drive shaft surface 112. The small volume of the cavity reduces the likelihood of ignition within the cavity, but under some circumstances the spark may be sufficient to ignite a flammable gas in the cavity. If gas within the cavity ignites, then the enclosure 104 and the bearing holder 121 contain the ignition within the cavity and prevent the ignition from spreading outside the cavity. While the gaps formed between the enclosure 104 and the drive shaft 112 and between the drive shaft 112 and the bearing holder 121 are not airtight, the gaps are sufficiently narrow to prevent sufficient thermal energy from a flame within the cavity from escaping the cavity to ignite flammable gasses that are in the motor housing interior 124 or exterior to the motor 128.

FIG. 9 depicts a detailed view of the enclosure housing 104, ground ring 108, bearing holder 121, and drive shaft of FIG. 1 and FIG. 2. FIG. 9 illustrates examples of the brushes 952 that are connected to the ground ring 108 and extend to the surface of the drive shaft 112. FIG. 9 also illustrates the cavity 928 that is formed between the enclosure housing 104 and the bearing holder 121 and contains the ground ring 108. FIG. 9 also illustrates the gap 940 that is formed between the perimeter of the opening in the enclosure 104 and the outer surface of the drive shaft 112. The gap 940 defines a flame path that dissipates the thermal energy of a flame if a flammable material in the cavity 928 ignites. In the example of FIG. 9, the opening in the bearing holder 121 also forms a gap 942 between the perimeter of the opening in the bearing holder 121 and the drive shaft 112. The gap 942 is substantially the same size as the gap 940 also forms a flame path in the embodiment of FIG. 9. Additional embodiments that are described in more detail below also include one or more flame paths between a drive shaft and an enclosure that prevent the spread of flame from a cavity that contains a ground ring to an outside environment.

Figure 3:
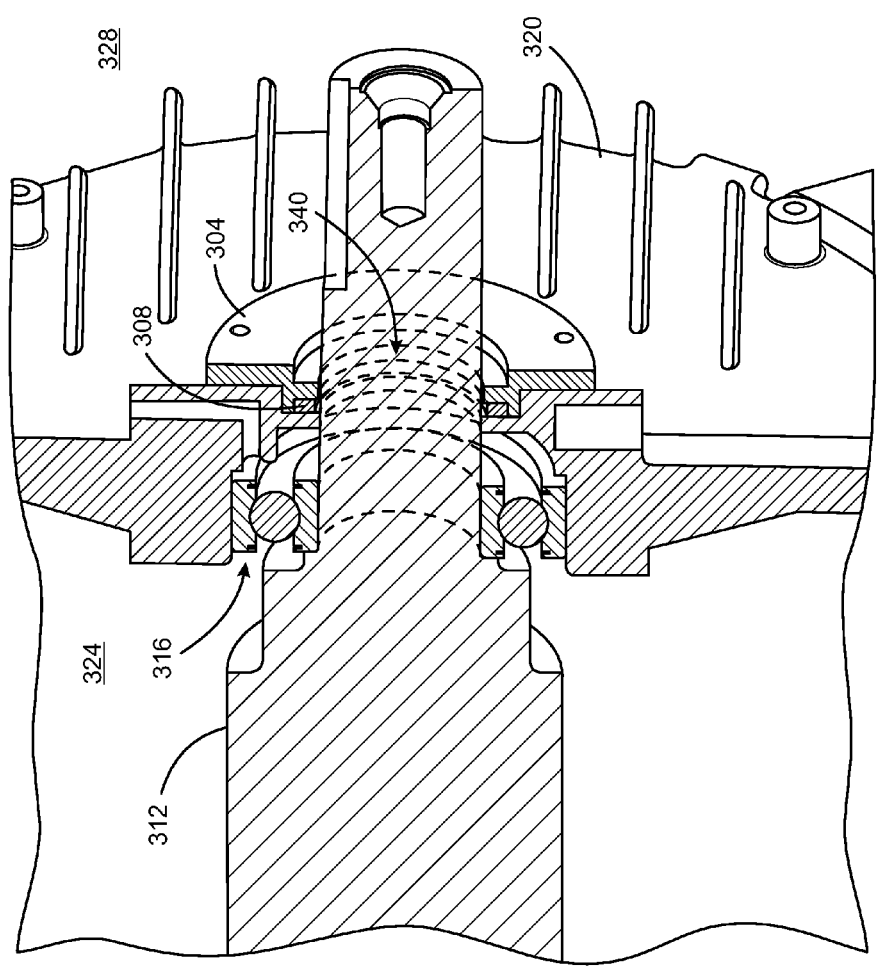
FIG. 3 is a cut-away view of an enclosure for a ground ring and a ground ring that is mounted on an exterior of an electric motor housing.
Figure 4:
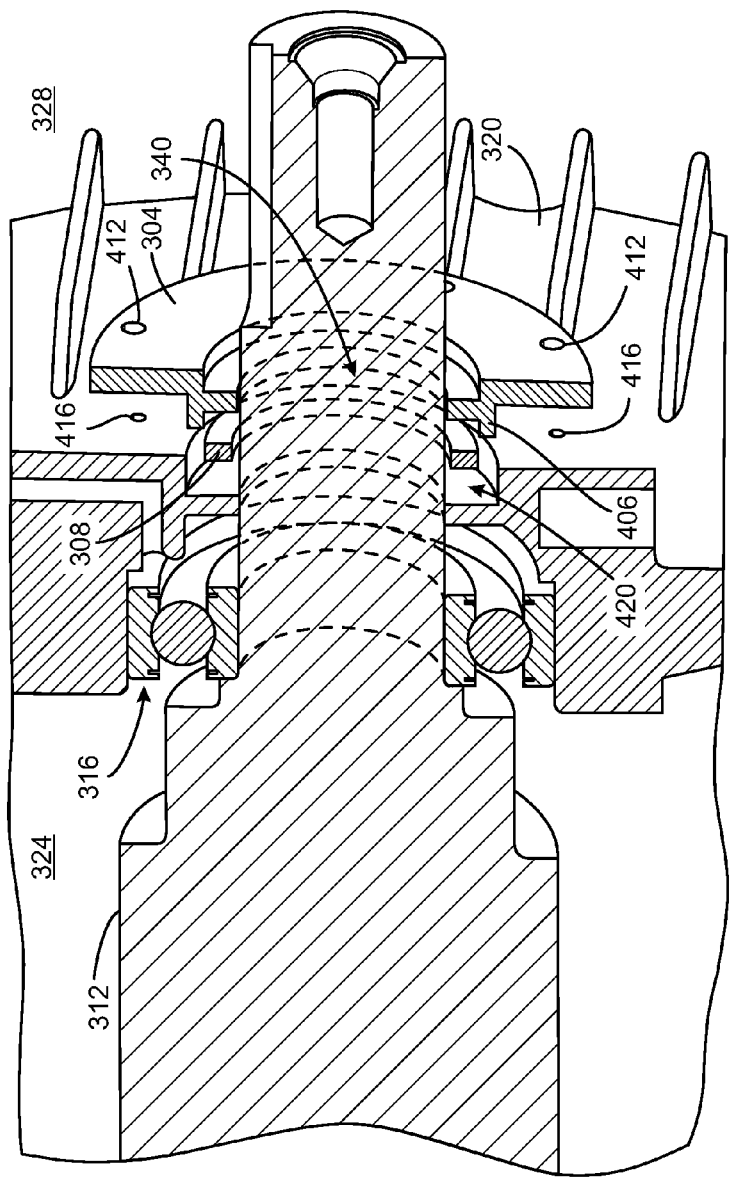
FIG. 4 is a partially exploded view of the enclosure, ground ring, and electric motor of FIG. 3.

FIG. 3 and FIG. 4 depict an alternative configuration of an enclosure for a ground ring. FIG. 3 and FIG. 4 depict an enclosure 304 for a ground ring 308 that surrounds an electric motor drive shaft 312 and is attached to an exterior side of an electric motor housing 320. The drive shaft 312 engages a bearing 316 and emerges from the electric motor housing 320 through the ground ring 308 and enclosure 304 to drive a mechanical load (not shown). The bearing 316 is a rolling element bearing such as a ball bearing, cylindrical roller, or any other suitable bearing. The enclosure 304 and ground ring 308 are positioned on the exterior side 328 of the motor housing 320. For illustrative purposes, the view of the electric motor in FIG. 3 and FIG. 4 omits other components of the motor, such as the rotor, stator, and windings.

In FIG. 3 and FIG. 4, the enclosure 304 is adapted to hold the ground ring 308 in a cavity formed between the enclosure 304 and the exterior of the motor casing 320 in a similar manner to the enclosure 104 and ground ring 108 of FIG. 1 and FIG. 2. In the embodiment shown in FIG. 3 and FIG. 4, the enclosure 304 includes a flange 406 that fits a corresponding mounting bracket 420 that is formed in the exterior of the motor housing 320. The mounting bracket 420 is another embodiment of a mounting member that is formed on the exterior of the motor housing 320. The enclosure 304 has bolt holes 412 that correspond to bolt holes 416 in the motor housing 320 that enable the enclosure 304 to be attached to the motor housing 320 to form a tight fit. The enclosure 304 also includes an opening 340 that enables the drive shaft 312 to pass through the enclosure 304 with a predetermined gap (e.g. from 0.001 to 0.020 inches) between the surface of the drive shaft 312 and the perimeter of the opening in the enclosure 304. The ground ring 308 is secured in place between the enclosure 304 and the housing 320 around the drive shaft 312 to remove electric charge that forms on the surface of the drive shaft 312 during operation of the motor.

In the embodiment of FIG. 3 and FIG. 4, the enclosure 304 and the ground ring 308 are mounted to the exterior of the motor housing 320, and operate in a similar manner to the enclosure 104 and ground ring 108 depicted in FIG. 1 and FIG. 2. The ground ring 308 provides a path of least resistance for electrical charges that accumulate on the drive shaft 312 to prevent electrical arcs that could damage the bearing 316. The enclosure 304 prevents any ignition that potentially forms in the cavity from spreading to the exterior 328 or interior 324 of the motor. The external mounting of the enclosure 304 and ground ring 308 enables convenient access for maintenance or replacement of the ground ring 308. The internal configuration of FIG. 1 and FIG. 2 enables full access to the drive shaft 112 outside of the motor housing 120. In one embodiment, a single motor housing accepts both the internal enclosure and ground ring configuration of FIG. 1 and FIG. 2 and the external configuration of FIG. 3 and FIG. 4 in different operating modes.

Figure 5:
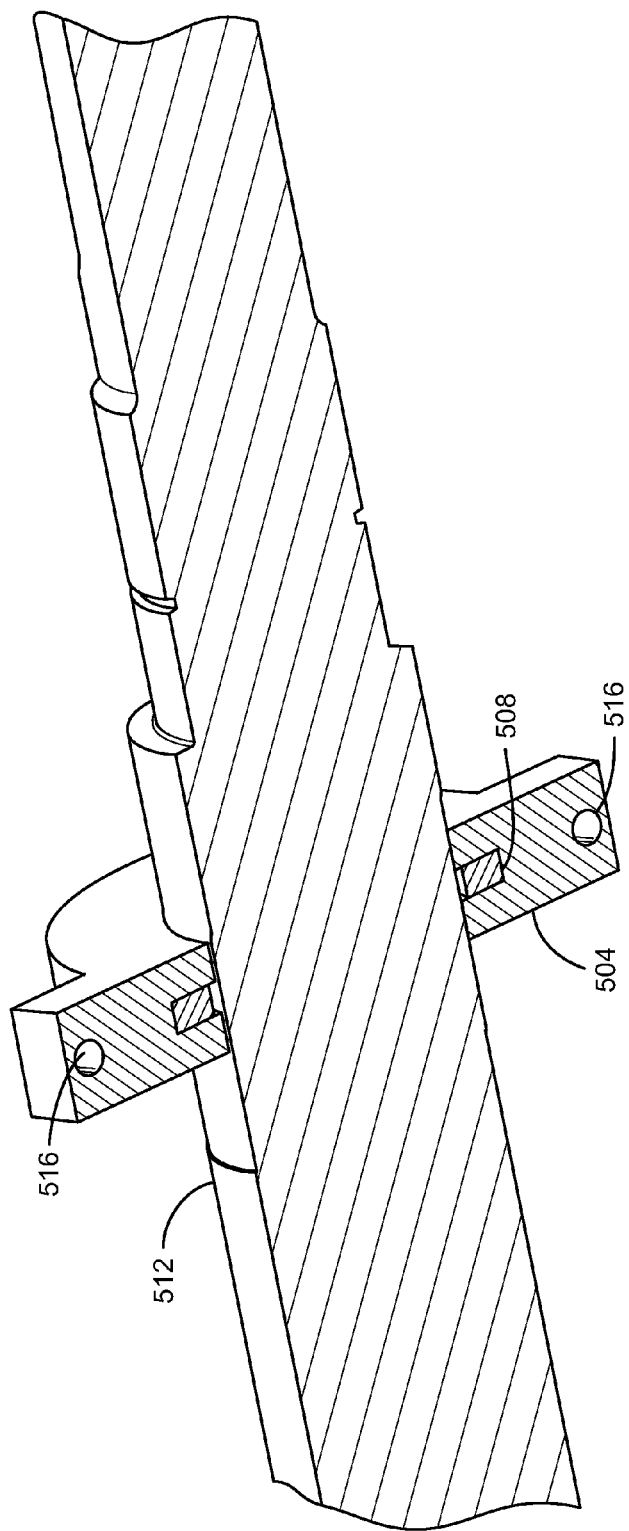
FIG. 5 is a cut-away view of a drive shaft in an electric motor with a ground ring enclosure and ground ring positioned around the drive shaft.
Figure 6:
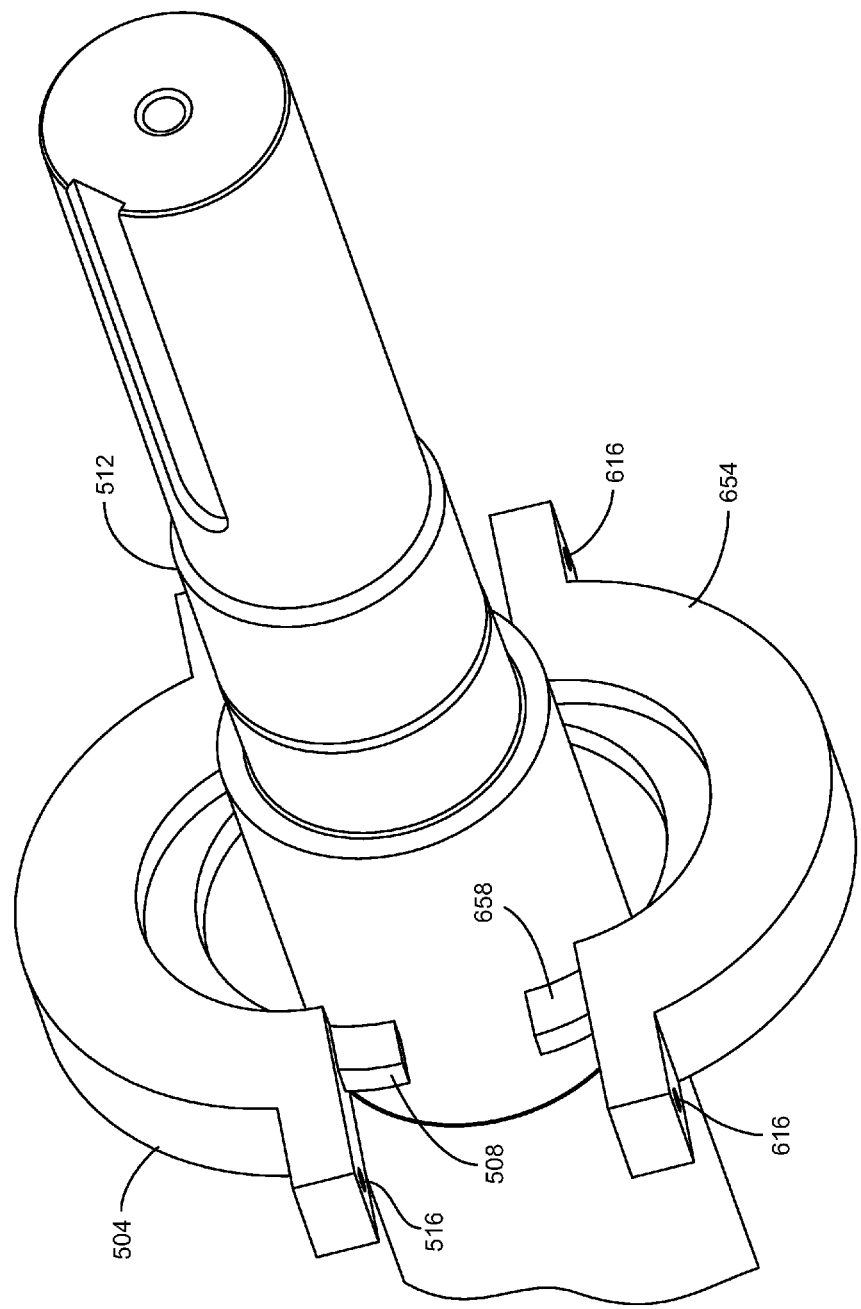
FIG. 6 is a partially exploded view of a multi-piece ground ring enclosure and ground ring that are assembled around a drive shaft in an electric motor.

FIG. 5 and FIG. 6 depict another configuration of a multi-piece ground ring enclosure and ground ring that are configured to engage a drive shaft. FIG. 5 depicts a ground ring enclosure member 504 that includes a slot to hold a ground ring member 508 around a drive shaft 512. FIG. 6 depicts another ground ring enclosure member 654 that includes another slot to hold a second ground ring member 658. The enclosure member 504 includes bolt holes 516 that correspond to bolt holes 616 in the enclosure member 654, and enable the two enclosure members to be bolted to together to form a single enclosure. In the embodiments of FIG. 5 and FIG. 6, the enclosure members 504 and 654 are semi-circular and form a circular opening for the drive shaft 512. Similarly, the ground ring members 508 and 658 are semi-circular and are electrically connected together when the two enclosure elements 504 and 654 are joined together around the drive shaft 512. The enclosure members 504 and 654 form an opening for the drive shaft 512 that enables the drive shaft 512 to pass through the enclosure with predetermined gap (e.g. from 0.001 to 0.020 inches) between the surface of the drive shaft 512 and the perimeter of the opening in the enclosure. The ground ring enclosure and ground ring configuration of FIG. 5 and FIG. 6 can be used in situations where neither end of the drive shaft 512 is easily accessible and the ground ring and enclosure is assembled around a predetermined section of the drive shaft 512.

Figure 7:
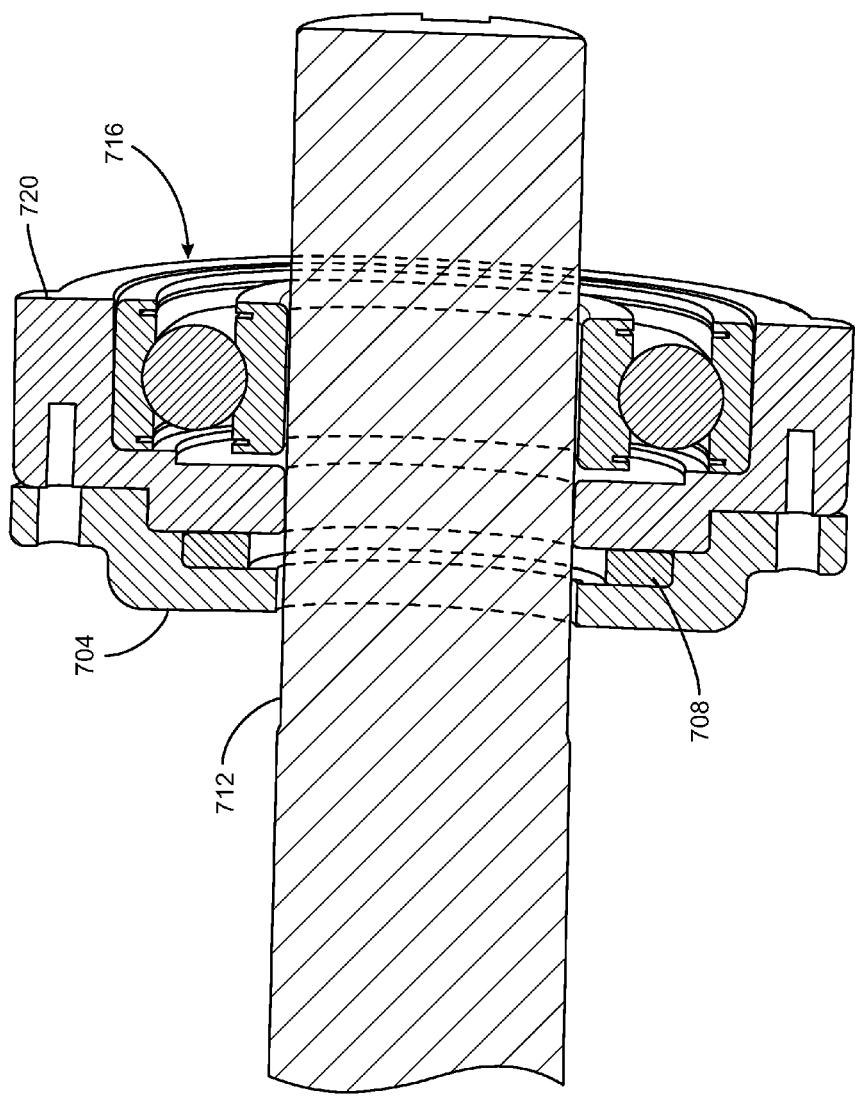
FIG. 7 is a cross sectional view of an enclosure for a ground ring, a ground ring, and a bearing that are mounted on a drive shaft of an electric motor, or that of the driven equipment.
Figure 8:
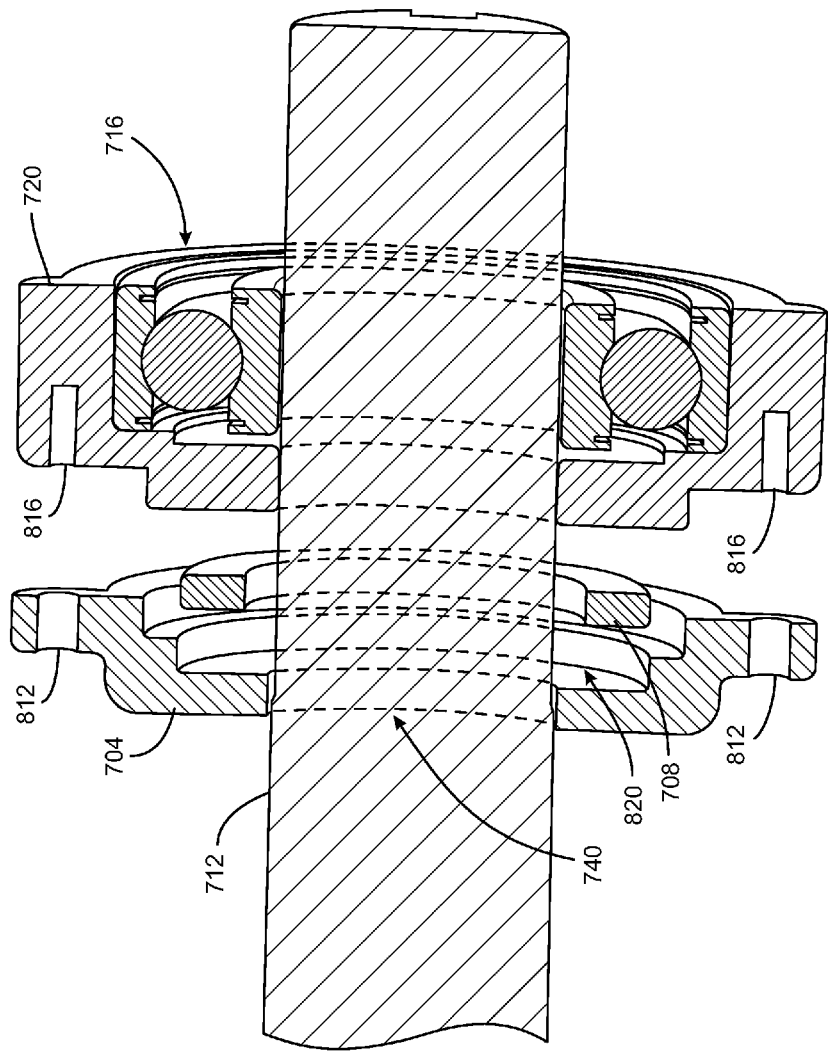
FIG. 8 is a partially exploded view of the enclosure for a ground ring, ground ring, and bearing of FIG. 7.

FIG. 7 and FIG. 8 depict a configuration of a ground ring, enclosure, and bearing that are placed on a drive shaft 712 of an electric motor or a shaft that is connected to driven equipment independently of the motor housing. FIG. 7 depicts a ground ring enclosure 704, ground ring 708, and a bearing 716 that engage the drive shaft 712. The enclosure 704 includes a bracket 820 that accepts the ground ring 708 and holds the ground ring 708 in a predetermined position relative to the surface of the drive shaft 712. The enclosure 704 includes attachment members, such as bolt holes 812, which enable the enclosure 704 to be attached to a housing 720 of the bearing 716 through corresponding bolt holes 816. The enclosure 704 and the bearing housing 720 form a cavity that includes the ground ring 708. The enclosure 704 and bearing housing 720 form a tight fit. The drive shaft 712 extends through an opening 740 in the enclosure 704 and through the bearing 716. The opening 740 in the enclosure 704 is arranged around the drive shaft 712 with a predetermined gap (e.g. from 0.001 to 0.020 inches) between the surface of the drive shaft 712 and the perimeter of the opening 740 in the enclosure 704. The bearing 716 is, for example, a rolling bearing such as a ball bearing, cylindrical roller, or any other suitable bearing.

During operation, the enclosure 704, ground ring 708, and bearing 716 with bearing housing 720 are mounted on the drive shaft 712. The ground ring 708 is electrically connected to an electrical ground using, for example, a wire (not shown). The bearing 716 supports the assembly on the drive shaft 712 and enables the opening 740 in the ground ring enclosure 712 to form the predetermined gap around the drive shaft 712 as the drive shaft 712 rotates. During operation, the ground ring 708 provides a path of least resistance for electrical charges that accumulate on the drive shaft 712. The electrical charges dissipate through the ground ring 708 instead of arcing through the bearing 716 or through other bearings in electrical motors or other components (not shown) that engage the drive shaft 712. As described above, the enclosure 704 and bearing housing 720 form a cavity that contains the ground ring 708. If flammable gasses enter the cavity and are ignited by sparks between the drive shaft 712 and the ground ring 708, the enclosure 704, and the bearing housing 720 prevents the ignition within the cavity from spreading outside of the cavity where flammable gasses may possibly be present outside of the enclosure 704. The enclosure 704, ground ring 708, and bearing 716 assembly of FIG. 7 and FIG. 8 can be used for motors that do not directly accommodate ground rings and ground ring enclosures.

While the illustrative embodiments of FIG. 1-FIG. 8 depict drive shafts of electric motors, the ground rings and ground ring enclosure embodiments that are described herein are also suitable for use with rotating shafts that form part of the driven equipment in addition to motor drive shafts. The ground ring and ground ring enclosure assemblies depicted above can engage any rotating shaft that is electrically connected to the electric motor to discharge static electricity before a buildup of the static electricity damages bearings in either of both of the electric motor and the driven equipment. Additionally, the ground ring enclosure prevents an escape of flame from the cavity surrounding the ground ring when engaging any shaft that is electrically connected to the motor drive shaft, including the motor drive shaft itself.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. An enclosure housing and ground ring assembly comprising:
    a ground ring having a single opening that is configured with a single diameter to enable a shaft to pass through the single opening;
    an enclosure housing configured to receive the ground ring and hold the ground ring in a predetermined position around the shaft electrically connected to a drive shaft of an electric motor, the enclosure housing having a single opening with a single diameter that is aligned with the single opening in the ground ring, the single opening in the enclosure housing being configured to enable the shaft to pass through the enclosure housing and then through the single opening in the ground ring, the single diameter of the single opening in the enclosure housing being less than the single diameter of the single opening in the ground ring; and
    a mounting member having a single opening that is aligned with the single opening in the ground ring and the single opening in the enclosure housing to enable the shaft to continue to pass through the single opening in the mounting member after the shaft has passed through the single opening in the enclosure housing and then through the single opening in the ground ring, the single opening in the mounting member having a single diameter that is less than the diameter of the single opening in the ground ring, the enclosure housing and the mounting member forming a cavity that contains the ground ring with a tight fit between the enclosure housing and the mounting member,
    the cavity having a width that is parallel to a longitudinal axis of the shaft and that corresponds to a distance parallel to the longitudinal axis of the shaft that extends from an edge of the single opening of the enclosure housing that is most proximal to the ground ring to an edge of the opening of the mounting member that is most proximal to the ground ring, and
    the enclosure housing forming a predetermined gap between a perimeter of the opening of the enclosure housing and a surface of the shaft that has a single height that corresponds to a difference between a diameter of the shaft and the single diameter of the opening of the enclosure housing along a length of the shaft from an axial position where a surface of the ground ring axially faces a surface of the enclosure housing to an edge of the single opening of the enclosure housing most distal from the ground ring, and
    the mounting member has another predetermined gap between a perimeter of the opening in the mounting member and the surface of the shaft that has a single height that corresponds to a difference between a diameter of the shaft and the single diameter of the opening of the mounting member along another length of the shaft from an axial position where a surface of the ground ring axially faces a surface of the mounting member to an edge of the single opening of the mounting member most distal from the ground ring.

2. The assembly of claim 1, the mounting member being a bearing holder that engages an interior of a housing of the electric motor proximate to a bearing in the electric motor and an attachment is configured to attach the enclosure housing to the bearing holder.

3. The assembly of claim 2, wherein the other predetermined gap formed between the perimeter of the single opening of the mounting member and the surface of the shaft is approximately equal to the predetermined gap between the perimeter of the single opening in the enclosure housing and the surface of the shaft.

4. The assembly of claim 1, wherein the mounting member is formed in an exterior of a housing of the electric motor.

5. The assembly of claim 1 wherein the predetermined gap between the perimeter of the single opening of the enclosure housing and the surface of the shaft is approximately 0.009 inches.

6. The assembly of claim 1 wherein the predetermined gap between the perimeter of the single opening of the enclosure housing and the surface of the shaft is in a range of approximately 0.001 inches to 0.020 inches.

7. The assembly of claim 1 further comprising:
at least one brush formed from an electrically conductive material that is attached to the ground ring to provide a path for an electrical discharge from the shaft to the ground ring.

8. The assembly of claim 1, wherein the shaft is the drive shaft of the electric motor.

9. A ground ring assembly comprising: a ground ring having a single opening that is configured with a single diameter to enable a shaft to pass through the single opening;
an enclosure housing configured to receive the ground ring and hold the ground ring in a predetermined position around the shaft, the shaft being connected to a drive shaft of an electric motor, the enclosure housing having a single opening that is aligned with the single opening in the ground ring that enables the shaft to pass through the single opening in the enclosure housing and then pass through the single opening in the ground ring, the single diameter of the single opening in the enclosure housing being less than the single diameter of the single opening in the ground ring; and
a bearing holder having a single opening that is aligned with the single opening in the ground ring and the single opening in the enclosure housing, the single opening in the bearing holder being configured to enable the shaft to continue to pass through the single opening in the bearing holder after the shaft has passed through the single opening in the enclosure housing and the single opening in the ground ring, the single opening in the bearing holder having a single diameter that is less than the single diameter of the single opening in the ground ring,
the enclosure housing being attached to the bearing holder to form a cavity that contains the ground ring, the cavity having a width that is parallel to a longitudinal axis of the shaft, that extends from an edge of the single opening of the enclosure housing that is most approximate to the ground ring to an edge of the opening in the bearing holder that is most approximate to the ground ring, the enclosure housing and the bearing holder having a tight fit,
the enclosure housing with a predetermined gap between a perimeter of the single opening of the enclosure housing and a surface of the shaft that has a single height that corresponds to a difference between a diameter of the shaft and the single diameter of the opening of the enclosure housing along a length of the shaft from an axial position where a surface of the ground ring axially faces a surface of the enclosure housing to an edge of the opening in the enclosure housing that is most distal to the ground ring, and
the bearing holder with another predetermined gap between a perimeter of the single opening in the bearing holder and the surface of the shaft that has a single height that corresponds to a difference between a diameter of the shaft and the single diameter of the opening of the bearing holder along another length of the shaft from an axial position where a surface of the ground ring axially faces a surface of the bearing holder to an edge of the single opening of the bearing holder most distal from the ground ring.

10. The ground ring assembly of claim 9 wherein the predetermined gap between the perimeter of the opening of the enclosure housing and the surface of the shaft is approximately 0.009 inches.

11. The ground ring assembly of claim 9 wherein the predetermined gap between the perimeter of the opening of the enclosure housing and the surface of the shaft is in a range of approximately 0.001 inches to 0.020 inches.

12. The ground ring assembly of claim 9 wherein the shaft is the drive shaft of the electric motor.

\* \* \* \* \*